(12) United States Patent
Lewis et al.

(10) Patent No.: US 9,987,983 B2
(45) Date of Patent: Jun. 5, 2018

(54) PARKING ASSIST SYSTEM FOR A VEHICLE AND METHOD OF USING THE SAME

(71) Applicant: GM GLOBAL TECHNOLOGY OPERATIONS LLC, Detroit, MI (US)

(72) Inventors: Allan K. Lewis, Windsor (CA); Michael T. Chaney, Jr., Royal Oak, MI (US); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 15/041,887

(22) Filed: Feb. 11, 2016

(65) Prior Publication Data
US 2017/0232890 A1    Aug. 17, 2017

(51) Int. Cl.
| | | |
|---|---|---|
| *G01C 21/26* | (2006.01) |
| *B60Q 9/00* | (2006.01) |
| *B60R 1/00* | (2006.01) |
| *G06K 9/00* | (2006.01) |
| *G06T 7/00* | (2017.01) |
| *G06K 9/46* | (2006.01) |
| *G06K 9/62* | (2006.01) |

(52) U.S. Cl.
CPC ............. *B60Q 9/002* (2013.01); *B60R 1/00* (2013.01); *G01C 21/26* (2013.01); *G06K 9/00805* (2013.01); *G06K 9/00812* (2013.01); *G06K 9/4604* (2013.01); *G06K 9/6202* (2013.01); *G06T 7/004* (2013.01); *G06T 7/0085* (2013.01); *B60R 2300/105* (2013.01); *B60R 2300/305* (2013.01); *B60R 2300/602* (2013.01); *B60R 2300/607* (2013.01); *B60R 2300/806* (2013.01); *B60R 2300/8086* (2013.01)

(58) Field of Classification Search
CPC ..... B60Q 9/002; B60R 1/00; B60R 2300/105; B60R 2300/607; B60R 2300/806; B60R 2300/8086; G01C 21/26; G06K 9/00805; G06T 7/004; G06T 7/0085
USPC ........................................................ 348/148
See application file for complete search history.

(56) References Cited

U.S. PATENT DOCUMENTS

| | | | | |
|---|---|---|---|---|
| 2003/0235327 A1* | 12/2003 | Srinivasa | ............. | G06K 9/3241 382/104 |
| 2011/0202178 A1* | 8/2011 | Zhen | .................... | B66B 13/143 700/275 |
| 2012/0194355 A1* | 8/2012 | Thomas | .................... | B60R 1/00 340/932.2 |

(Continued)

*Primary Examiner* — William C Vaughn, Jr.
*Assistant Examiner* — Jae N Noh
(74) *Attorney, Agent, or Firm* — Reising Ethington, P.C.

(57) ABSTRACT

A parking assist system and method that uses one or more cameras on the side of a vehicle to provide modified video output to an electronic display unit that can assist a driver with parallel parking. The modified video output provides the driver with real time visual feedback of the position of the vehicle, with respect to a curb or other barrier, and may also indicate if the current position is compliant with local parking regulations, as determined based on the vehicle's current location. The modified video output includes one or more visual indicators that may be graphically superimposed over top of the video output from the side camera so that the driver can see in real time when the vehicle is or is not lawfully parallel parked.

19 Claims, 4 Drawing Sheets

(56) References Cited

U.S. PATENT DOCUMENTS

2017/0129489 A1\* 5/2017 Pawlicki ............... B60W 30/18
2017/0229020 A1\* 8/2017 Colella ................. B60K 35/00

\* cited by examiner

PARKING ASSIST SYSTEM FOR A VEHICLE AND METHOD OF USING THE SAME

FIELD

The present invention relates generally to parking assist systems for a vehicle and, more particularly, to systems and methods that use an electronic display unit to provide a driver with real time feedback during a parallel parking maneuver.

BACKGROUND

Many drivers have long struggled with parallel parking, which is a method of parking that involves positioning a vehicle in a parking spot that is both parallel to the road and is typically in line with other vehicles. Parallel parking is oftentimes required in urban settings and other areas where there is limited parking space. Typically, a driver parallel parks a vehicle by initially driving slightly past the intended parking spot, and then reversing gently into the spot; this process may need to be repeated several times, depending on the size of the vehicle, the size of the parking spot, the proximity of the adjacent vehicles, the skill of the driver, etc.

In addition to the inherent challenges that parallel parking presents to some drivers, different countries, states, provinces, cities, and other municipalities oftentimes have differing parking regulations in terms of what constitutes a compliant or lawfully parked vehicle. Some municipalities require the vehicle wheels to be within 18 inches of a curb, others require 12 inches, and some are even limited to 6 inches or less.

Thus, there may be a need for a method and system that assists drivers with parallel parking and informs them of when the parallel parked vehicle is compliant with local regulations.

SUMMARY

According to one embodiment, there is provided a method of using a parking assist system for a host vehicle, and the parking assist system includes a side camera and an electronic display unit. The method may comprise the steps of: obtaining parking regulations; detecting a parallel parking maneuver; determining a current position of the host vehicle with respect to a nearby curb or other barrier during the parallel parking maneuver; using the current position of the host vehicle to determine if the host vehicle is compliant with the parking regulations; and displaying modified video output on the electronic display unit. The modified video output provides real time visual feedback of the parallel parking maneuver and includes one or more visual indicators to indicate compliance or non-compliance with the parking regulations.

According to another embodiment, there is provided a parking assist system for use with a host vehicle. The system may comprise: a parking assist control unit; a side camera that is coupled to the control unit and provides the control unit with video output of an area located to the side of the host vehicle; a communication unit that is coupled to the control unit and provides the control unit with communication output that includes one or more parking regulations; and an electronic display unit that is coupled to the control unit and displays modified video. The control unit is configured to determine a current position of the host vehicle with respect to a nearby curb or other barrier, to use the current position of the host vehicle to determine if the host vehicle is compliant with the parking regulations, and to modify the video output by adding one or more visual indicators that indicate compliance or non-compliance with the parking regulations

DRAWINGS

Preferred exemplary embodiments will hereinafter be described in conjunction with the appended drawings, wherein like designations denote like elements, and wherein.

DESCRIPTION

The parking assist system and method described herein uses one or more cameras on the side of a vehicle to provide modified video output to an electronic display unit that can assist a driver with parallel parking. The modified video output provides the driver with real time visual feedback of the position of the vehicle, with respect to a curb or other barrier, and may also indicate if the current position is compliant with local regulations concerning parallel parked vehicles. In some municipalities, the lawful distance from a parallel parked vehicle to a curb is less than or equal to 18 inches, whereas other municipalities require the vehicle to be less than or equal to 12 inches or even 6 inches. The parking assist system and method described herein can automatically obtain local parking regulations based on the vehicle's current location, and use those regulations to display modified video output to the driver that indicates if the vehicle is properly parallel parked or not.

Figure 1:
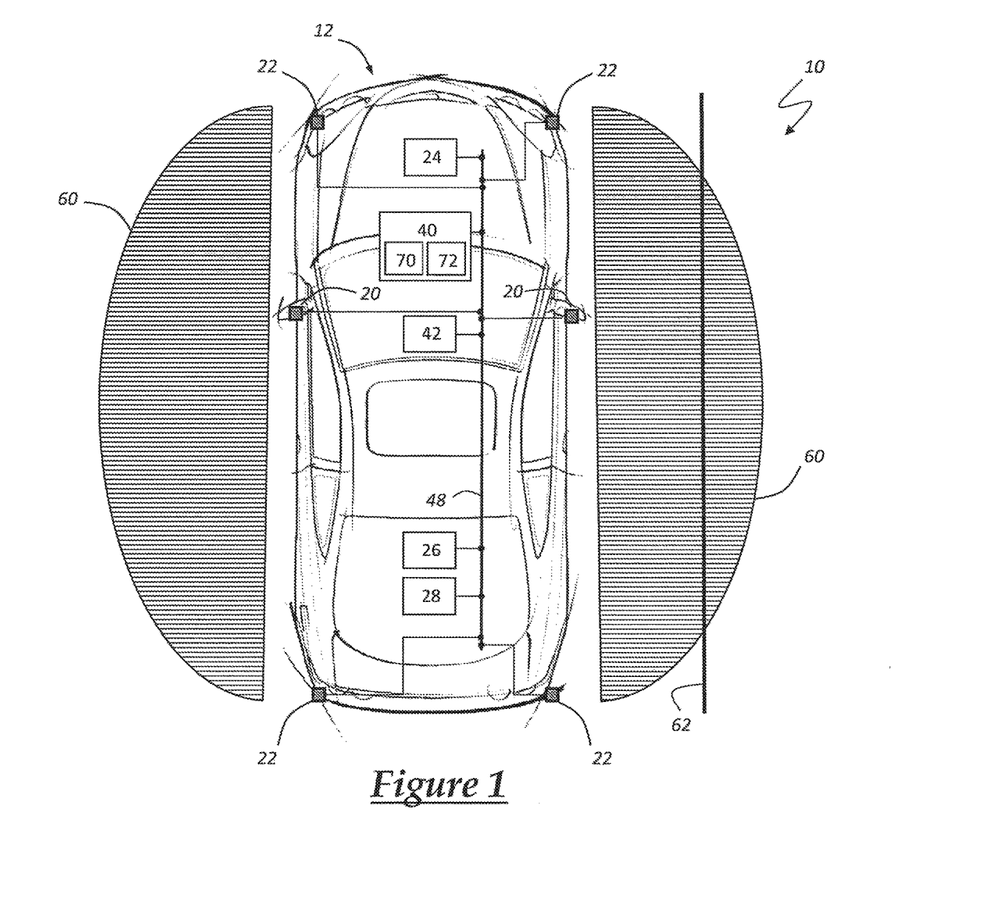
FIG. 1 is a schematic block diagram of an exemplary embodiment of a parking assist system.

With reference to FIG. 1, there is shown a general and schematic view of an exemplary parking assist system 10 installed on a host vehicle 12. It should be appreciated that the present system and method may be used with any type of vehicle, including traditional vehicles, hybrid electric vehicles (HEVs), extended-range electric vehicles (EREVs), battery electrical vehicles (BEVs), motorcycles, passenger vehicles, sports utility vehicles (SUVs), cross-over vehicles, trucks, vans, buses, recreational vehicles (RVs), etc. These are merely some of the possible applications, as the parking assist system and method described herein are not limited to the exemplary embodiments shown in the drawings, and could be implemented in any number of different ways.

According to one example, the parking assist system 10 is mounted or installed on a host vehicle 12 and includes a pair of side cameras 20, one or more object detection sensors 22, one or more vehicle dynamic sensors 24, a navigation unit 26, a communication unit 28, a parking assist control unit 40, and an electronic display unit 42, all of which may be connected via a vehicle communication network or bus 48. The present system and method are not limited to any particular vehicle communication network, as any suitable network or bus may be used (e.g., a Controller Area Network (CAN), a Local Interconnect Network (LIN), Byteflight, a Domestic Digital Bus (D2B), FlexRay, Media Oriented Systems Transport (MOST), a wireless bus, or some other type of network known in the art). Furthermore, it is possible for the parking assist system 10 to be part of or to at least be utilized by a self-parking, an automatic parking and/or any other type of vehicle autonomous maneuvering system.

The side cameras 20 provide the parking assist system 10 with video output of a region or area of interest 60 that is generally located on the side of the host vehicle 12. According to one embodiment, each of the side cameras 20 is part of a side mirror assembly and is a downward facing camera that is directed along the side or flank of the host vehicle 12 in the area of interest 60. Each of the side cameras 20, which can also be called surround view or satellite cameras, can be directly or indirectly connected to the parking assist control unit 40, as illustrated in FIG. 1 which shows the cameras connected to the control unit via the vehicle bus 48. Some non-limiting examples of suitable side cameras 20 include those based on charge coupled device (CCD) or complementary metal oxide semiconductor (CMOS) technology, especially those providing wide-angle or ultra-wide-angle video output of the area along the side of the host vehicle 12. It should be appreciated that the side cameras 20 are not limited to any particular type, brand or model. Some potential embodiments or features that may be used with cameras 20 include: infrared LEDs for night vision; wide angle or fish eye lenses; surface mount, flush mount, or side mirror mount cameras; and wired or wireless cameras, to cite a few possibilities. When a driver is parallel parking the host vehicle 12, it is expected that a curb 62 or an edge of a sidewalk will likely come into the field-of-view of one of the side cameras 20 and will be captured in the video output so that the present system and method can use its position in the modified video output that is presented to the driver, as will be explained in more detail.

Object detection sensors 22 provide the parking assist system 10 with object detection output concerning the area of interest 60 and are optional, in that they may or may not be used to supplement the video output provided by the side cameras 20. As shown in FIG. 1, object detection sensors 22 may be located in the front vehicle bumpers, in the rear vehicle bumpers and/or at a number of other strategic locations around the host vehicle 12 and can be connected to the parking assist control unit 40 through the vehicle bus 48. While not shown, object detection sensors 14 may also be placed in the vehicle doors or included within the side mirror assemblies with side cameras 20. Object detection sensors 22 may be a single sensor or a combination of sensors, and can include without limitation, a radar device, a laser device, a lidar device, a vision device (e.g., camera, etc.), or a combination thereof. In addition to simply detecting the presence of objects, object detection sensors 22 may also be used, either alone or in conjunction with other sensors, to determine the distance between the detected objects and the vehicle 12. Side camera 20 could also be used in conjunction with such sensors. It should be appreciated that while four object detection sensors 22 are illustrated in FIG. 1, the number of sensors required may vary depending on the type of sensor and vehicle. Object detection sensors 14 are calibratable and configured to create a field-of-view that may correspond with or overlap with the area of interest 60. The term "objects" should be broadly construed to include any objects that are detectable in the sensor field-of-view, including individual items, curbs, barriers and/or other vehicles. For purposes of illustration, the area of interest 60 is shown primarily extending along the sides of host vehicle 12. However, one of ordinary skill in the art appreciates that typical object detection and tracking systems can be implemented on all sides of the host vehicle 12 (including in front of and behind the host vehicle) and in various combinations such that objects may be detected and tracked 360° around the vehicle 12.

Vehicle dynamic sensors 24 provide the parking assist system 10 with sensor output that includes various readings, measurements, and/or other information that may be useful for carrying out the present method. For example, vehicle dynamic sensors 24 may be directly or indirectly connected to the parking assist control unit 40 and may include sensors or other components for measuring: wheel speed, wheel acceleration, vehicle speed, vehicle acceleration (longitudinal and/or lateral acceleration), vehicle direction (forward versus backward), yaw rate, steering wheel angle, other vehicle dynamics, as well as other sensors known in the art but not mentioned here. Sensors 24 can utilize a variety of different sensor types and techniques, including those that use rotational wheel speed, ground speed, an accelerometer, an inertial measurement unit (IMU), accelerator pedal position, gear shifter selection, engine speed, engine output, and throttle valve position, to name a few. Skilled artisans will appreciate that these sensors may operate according to optical, electromagnetic and/or other technologies, and that other parameters may be derived or calculated from these readings (e.g., acceleration may be calculated from velocity). Sensors 24 may be embodied in hardware, software, firmware or some combination thereof, and these sensors may directly sense or measure the conditions for which they are provided, or they may indirectly evaluate such conditions based on information provided by other sensors, components, devices, modules, systems, etc. It is possible for any of the various sensor readings described below to be provided by some other component, device, module, system, etc. in host vehicle 10 instead of being provided by an actual sensor element. It should be appreciated that the foregoing scenarios represent only some of the possibilities, as the present system and method are not limited to any particular sensor or sensor arrangement.

Navigation unit 26 provides the parking assist system 10 with navigation output that includes the location of the host vehicle 12, road information, or a combination thereof. Depending on the particular embodiment, the navigation unit 26 may be a stand-alone component or it may be integrated within some other component or system within the vehicle. The navigation unit may be directly or indirectly connected to the parking assist control unit 40 and may include any combination of other components, devices, modules, etc., like a GPS unit, and may use the current position of the vehicle and road- or map-data to determine local parking regulations. For instance, the navigation output from navigation unit 26 may include the current location of the host vehicle and/or information regarding the proper distance to a curb for parallel parked vehicles, according to the municipality in which the host vehicle is currently located. The navigation unit 26 can store pre-loaded regulations and the like, or it can wirelessly receive such information through a telematics unit or some other communications device, to cite two possibilities.

Communication unit 28 provides the parking assist system 10 with communication output and enables mobile communications to and from the host vehicle 12. According to an exemplary embodiment, the vehicle communication unit 28, sometimes referred to a telematics control unit (TCU), includes some combination of an external interface for mobile communications (e.g., those compatible with Global System for Mobile Communications (GSM), General Packet Radio Service (GPRS), Wi-Fi, Worldwide Interoperability for Microwave Access (WiMAX) and/or Long Term Evolution (LTE)), a GPS unit, a processing unit, and/or a memory unit. The communication unit 28 preferably has a combination of hardware and software that is needed for wireless communication with other vehicles, call centers, satellites, cell towers, government agencies and/or any other device or system located apart from the vehicle. Communication unit 28 may be coupled to parking assist control unit 40 via bus 48 so that it can provide parallel parking and/or other regulations for a particular municipality (e.g., parking regulations for the city, state, province or country where the host vehicle 12 is currently located). According to one example, the communication unit 28 is configured to receive command signals from control unit 40 and, in response thereto, to automatically gather local parking regulations from a governmental entity or other resource over a suitable wireless network. Skilled artisans will appreciate that communications unit 28 can establish cellular and/or other wireless communications via a variety of known methods and is not limited to any particular type.

Parking assist control unit 40 acts as the main controller or control module of the parking assist system 10 and is at least partially responsible for performing or carrying out the method described below. According to an exemplary embodiment, the parking assist control unit 40 is coupled to side cameras 20 and receives video output, is coupled to object detection sensors 22 and receives object detection output, is coupled to vehicle dynamic sensors 24 and receives sensor output, is coupled to navigation unit 26 and receives navigation output, is coupled to communications unit 28 and receives communication output, and is coupled to electronic display unit 42 and provides modified video output, although other combinations of devices may be coupled to the control unit instead. Parking assist control unit 40 may include any variety of electronic processing devices, memory devices, input/output (I/O) devices, and/or other known components, and may perform various control and/or communication related functions.

In an exemplary embodiment, parking assist control unit 40 includes an electronic memory device 70 that may receive and store any combination of the following items: video content from side cameras 20, information pertaining to nearby objects from object detection sensors 22, sensor readings from vehicle dynamic sensors 24, position or other navigation data from navigation unit 26, governmental parking regulations gathered by the communication unit 28, look up tables or other data structures, algorithms (e.g., algorithms embodied in the exemplary method described below), etc. Onboard memory device 70 may also store pertinent characteristics and background information pertaining to host vehicle 12, such as information relating to vehicle dimensions (e.g., weight, width and length), stopping distances, driver behavioral or historical data, particular sensor or camera locations and orientations on host vehicle 12, etc. Control unit 40 may also include an electronic processing device 72 (e.g., a microprocessor, a microcontroller, an application specific integrated circuit (ASIC), etc.) that executes instructions for software, firmware, programs, algorithms, scripts, applications, etc. that are stored in memory device 70 and may govern the methods described herein. Control unit 40 may be electronically connected to other vehicle devices, modules, and systems via bus 48 or some other suitable communication means and can interact with them when required. These are, of course, only some of the possible arrangements, functions and capabilities of parking assist control unit 40, as other embodiments could also be used.

Electronic display unit 42 displays modified video output so that the driver can monitor the position of the host vehicle 12, with respect to a curb or other barrier 62, as the host vehicle is being parallel parked. According to the exemplary embodiment of FIG. 1, the electronic display unit 42 is coupled to control unit 40 or some other device within the parking assist system 10 via the vehicle bus 48 and displays modified video output to the driver in real time. The display unit 42 may utilize any number of different display technologies, such as a liquid crystal display (LCD) or a light emitting diode (LED) display. It should be appreciated that the system and method described herein may use any suitable type of display unit 42 and are not limited to any particular one. For instance, the electronic display unit may be the type where the entire viewable surface of the display shows video from a camera 20; it may be the type where only a portion of the display surface shows video from a camera 20, whereas other portions of the display surface show other information (e.g., other camera angles, etc.); it could have daytime and nighttime modes that adjust the brightness accordingly; or it could have a touchscreen so that users can make selections or otherwise input data, to cite a few of the possibilities. The electronic display unit 42 may be mounted at any number of locations around the host vehicle 12, as illustrated in the different embodiments of FIG. 2.

Figure 2:
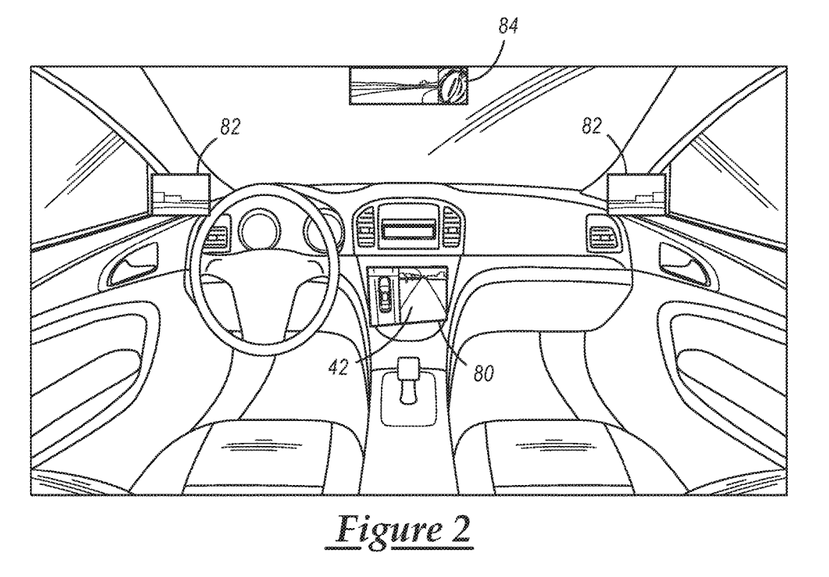
FIG. 2 is an illustration of a vehicle interior cabin that includes several different electronic display units, each of which may be part of the parking assist system of FIG. 1.

For example, the electronic display unit 42 could be part of a center stack or center console assembly 80 that is typically located beneath the dashboard in between the front driver and passenger seats. In that particular example, the center stack 80 includes the display unit 42, which is shown with a split-screen or picture-in-picture presentation having a birds-eye view on the left side of the display and a traditional back-up camera view on the right side of the display. It is also possible for the electronic display unit 42 to be part of a side view display assemblies 82 which are intended to replace traditional side view mirrors. Lastly, FIG. 2 shows another example of how the electronic display unit 42 could be implemented, where this time the display unit is integrated within an electronic rear view display assembly 84, sometimes referred to as a full display mirror (FDM). The rear view display 84, which can be used in lieu of a traditional rear view mirror, is also shown with a split-screen type of presentation where an area behind the host vehicle 12 is shown on the majority left side of the display, and an image that can assist with parking the host vehicle is shown on the far right side of the display. The purpose of FIG. 2 is to illustrate some of the potential implementations or locations for the electronic display unit 42, however, it should be recognized that these examples are non-limiting and that any number of other display unit embodiments may be used instead, including ones where the display unit 42 is included in multiple devices (e.g., display unit 42 is part of center stack 80 and side view display assemblies 82 or center stack 80 and rear view display 84). Also, it is not necessary for the displays to be arranged according to split-screen or picture-in-picture arrangements, as those are merely exemplary features.

Any of the devices 20-42 may be stand-alone devices, as illustrated in FIG. 1, or they may be incorporated or included within some other device, unit or module in the host vehicle (e.g., some of the sensors 22, 24 could be part of a vehicle safety module or an inertial measurement unit (IMU), the navigation unit 26 could be part of a telematics unit or the communications unit 28, the control unit 40 could be integrated within the electronic display unit 42 or an instrument cluster control module, etc.). Furthermore, any of the devices 20-42 may be dedicated devices, as depicted in FIG. 1, or they may be part of or shared by other systems or sub-systems in the vehicle (e.g., cameras 20 and/or some of the sensors 22, 24 could be part of an active safety system, an antilock brake system (ABS), an autonomous or semi-autonomous driving system and/or a self parking system; the display unit 42 and/or the control unit 40 could be part of a vehicle infotainment system, etc.). The video output, object detection output, sensor output, navigation output and/or the communication output from devices 20-28 may be directly provided to control unit 40 or indirectly provided through some other device, module and/or system, as is commonly known in the art. Similarly, the modified video output from control unit 40 may be directly or indirectly provided to the display unit 42. Accordingly, the devices 20-42 are not limited to the schematic representation in FIGS. 1-2 or the exemplary descriptions above, nor are they limited to any particular embodiment or arrangement so long as they can be used with the method described herein.

Figure 3:
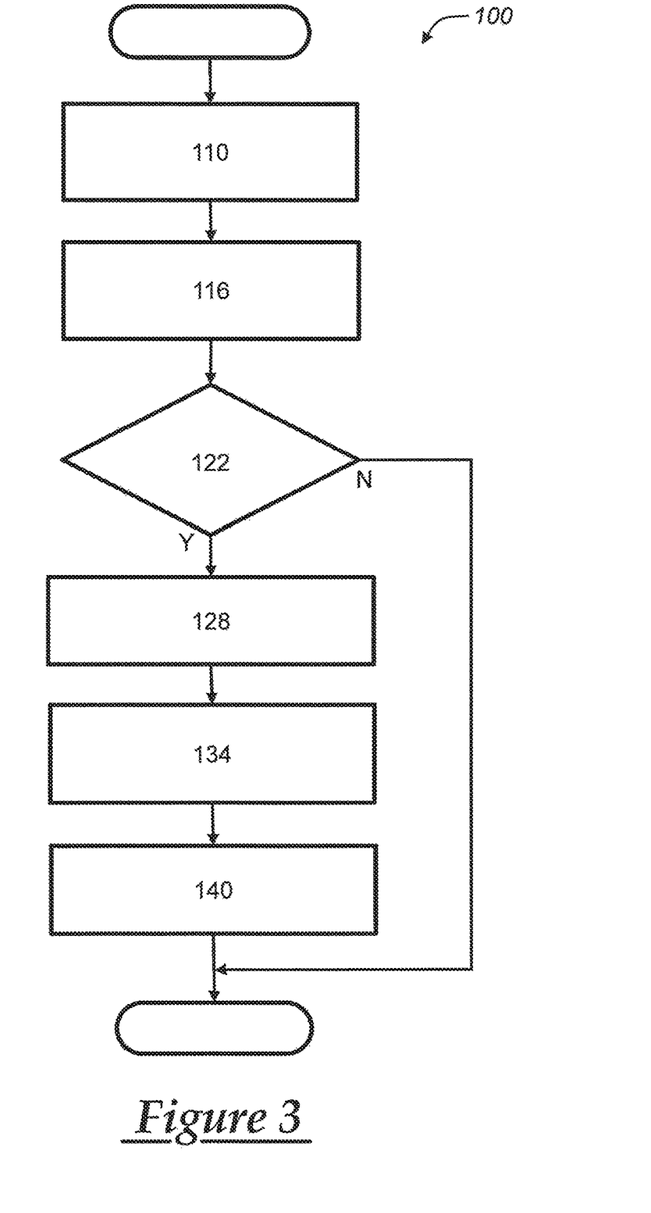
FIG. 3 is a flowchart of an exemplary embodiment of a parking assist method that may be used with the parking assist system of FIG. 1.

Turning now to FIG. 3, there is shown a flowchart of an exemplary parking assist method 100 that may be used in conjunction with parking assist system 10. Step 110 determines parking regulations for parallel parked vehicles and may do so in a number of different ways. For instance, it is possible for the host vehicle 12 to initially download and save the parking regulations for a geographical area (e.g., all of the parking regulations for an entire continent, for an entire country, for an entire state or province, for a particular city or county, or an average or representative set of regulations) and then to simply refer to the saved regulations when needed. Such an approach would only require the method to download the applicable regulations once (e.g., when the vehicle is initially manufactured) or a very few times, such as when the host vehicle leaves the broad geographical area of the initial download. In a different example, step 110 is performed periodically, such as every time there is a new over-the-air software reflash, whenever the host vehicle is brought in for service, or once a year or once a month. In yet another example, step 110 is performed every time the vehicle is turned on (i.e., following each ignition cycle).

Regardless of the frequency with which it is performed, step 110 may use the navigation unit 26 to determine the current location of the host vehicle, use the current location of the host vehicle to look up one or more parking regulations or ordinances, and then obtain the parking regulations for further use. The look up portion of this step may be performed by the communications unit 28, in which case the communication unit could automatically obtain the parking regulations from some remote entity based on host vehicle location and provide the obtained regulations to the rest of the system via communication output. Or the look up could be performed internally by the control unit 40, such as when the parking regulations are stored locally in memory device 70 or some other onboard device and obtained therefrom. In one embodiment, the parking regulations include a "maximum parallel parking distance," which is the maximum distance that a vehicle or a vehicle part (e.g., a wheel or bumper) can be from a curb or other barrier in order to be compliant with the regulation (i.e., to be lawfully parked). For instance, a maximum parallel parking distance could stipulate that in order for a vehicle to be lawfully parked, the vehicle's wheel must be less than or equal to 18, 12 or even 6 inches from the edge of a curb 62. According to another embodiment, step 110 does not obtain actual governmental or official parking regulations, but instead uses a representative or average value for the maximum parallel parking distance that can then be the basis for determining parallel parking compliance. Other embodiments are also possible.

In step 116, the method detects or otherwise recognizes when the host vehicle is being parallel parked. Stated differently, it is preferable that the method know when the host vehicle 12 is in the process of being parallel parked so that the parking assist techniques described later can be displayed to the driver at an appropriate time (i.e., during parallel parking and not during normal driving). Skilled artisans will appreciate that there are a number of potential ways in which parallel parking can be detected, any one of which could be used here. One potential way for the method to detect a parallel parking situation is by gathering object detection output from object detection sensors 22 and/or sensor output from vehicle sensors 24, and to identify the occurrence of parallel parking maneuvers within a certain distance of a curb 62. For example, if the host vehicle 12 is transitioning back and forth between short drive and reverse cycles or if the host vehicle speed is less than some speed threshold (e.g., less than 5 m.p.h.) at the same time that the host vehicle is less than a certain distance threshold from a curb (e.g., less than 24 inches), this usually indicates that a driver is trying to parallel park. Map or road data as part of navigation output from navigation unit 26 could be used in place of or to supplement the parallel parking detection techniques described above. If it is determined that the host vehicle 12 is probably not being parallel parked, then step 122 instructs the parking assist method to end so that the driver is provided with display information in the normal way; if, however, it is determined that the host vehicle is likely being parallel parked, then step 122 directs the method to step 128.

Step 128 determines a current position of the host vehicle with respect to a nearby curb or barrier. If the method has already determined the distance from the host vehicle to a curb (e.g., previously in step 116), then this step may or may not be skipped; it is sometimes helpful to periodically recalculate this distance, as it typically changes throughout a parallel parking procedure. In either case, step 128 may determine the distance from the host vehicle to a curb in one of a number of possible ways, some of which involve the use of image processing techniques that analyze one or more images taken from the video output provided by side camera 20 and, based at least in part on this analysis, calculate the distance from a vehicle tire to a curb 62. A first image processing technique counts the number of pixels between a tire of the host vehicle and an outside edge of the curb, and then correlates the pixel count to an actual distance based on a known scale or size of the image (e.g., 100 pixels may equal 1 inch). In a second image processing technique, step 128 superimposes or otherwise places a blank overlay image with distance markers on top of the real time image gathered from side camera 20 and uses the distance markers to estimate the distance between a tire of the host vehicle and an outside edge of the curb. This can be accomplished, for example, by identifying hash marks or other indicia that suggest the edges of the tire and curb and interpolating between them to estimate distance. A third potential image processing technique counts the number of pixels between the front and rear tires (both tires should be visible in the video output from the side camera 20), uses the known distance between the tires to correlate pixel count to distance, counts the number of pixels between the tire of interest and an outside edge of the curb, and then uses the previously established pixel count to distance relationship to determine the distance from the tire of interest to the curb edge. Those skilled in the art of image processing will know of other suitable techniques that may be used here instead.

In each of the aforementioned image processing techniques, the method must identify an edge of the curb before calculating the relevant distance. Edge detection and distance calculation may be part of a multi-stage process that includes the sub-steps of: extracting and storing an image from the video output; applying Canny, HOG and/or other suitable filters to the stored image and storing the filtered image; evaluating the filtered image and identifying edges within expected regions that indicate the presence of a curb or other barrier; waiting a predetermined amount of time; repeating the process a certain number of times or iterations; evaluating the different filtered images for consistency within the boundaries of the curb edges; concluding that a curb is indeed present if there is sufficient edge consistency; and determining the distance between the host vehicle and the edge of the curb.

The Canny filter mentioned above may be carried out using some combination of the following sub-steps: apply a Gaussian filter to smooth the image and remove the noise; find the intensity gradients of the image; apply non-maximum suppression to remove spurious responses to edge detection; apply a double threshold to determine potential edges; and track one or more of the detected edges by hysteresis and suppress weaker edges that are not connected to stronger or more pronounced edges. In this way, the method can determined if a curb edge is present and can help distinguish such an edge from other objects in the background of the image. The Histogram of Oriented Gradients (HOG) filter mentioned above counts occurrences of gradient orientation in localized portions of the image, which is similar to edge orientation histograms, sale-invariant feature transform descriptors and shape contexts, except that it is computed on a dense grid of uniformly spaced cells and uses overlapping local contrast normalization for improved accuracy. The preceding Canny and HOG filters may be used together or separately. Skilled artisans will know of other suitable image processing techniques that may be used as well.

Next, step 134 uses the current position of the host vehicle with respect to the curb or other barrier to determine if the host vehicle is compliant with the parking regulations. One way to potentially carry out this step is to simply compare the distances calculated in the previous step (i.e., the distances from the front wheel to the edge of the curb and the distance from the rear wheel to the edge of the curb) to the maximum parallel parking distance that was previously obtained. Consider the example where the calculated distance between the front wheel and the curb edge is 10 inches, the calculated distance between the rear wheel and the curb edge is 9 inches, and the maximum parallel parking distance for that particular location or municipality is 12 inches. In this example, step 134 would conclude that both the front and rear wheels are compliant with the parking regulations, and step 140 would indicate this to the driver by providing modified video output to the electronic display unit 42 that reflects both tires' compliance with the parking regulations (the following paragraphs provide some description and examples of how this may be carried out). Consider the same example, only the calculated distance from the rear wheel to the curb edge is 14 inches instead of 9 inches. In this example, step 134 would recognize that the front tire is compliant and the rear tire is non-compliant with parking regulations, and step 140 would instruct the display unit 42 to reflect this partial compliance through a visual representation to the driver, as will be explained.

Figure 4A:
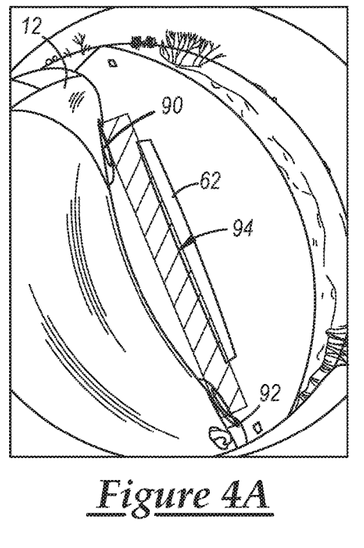
FIGS. 4A-4B, FIGS. 5A-5B and FIG. 6 are illustrations of modified video output images that can be presented to a driver and may be used with the parking assist system of FIG. 1 and method of FIG. 3
Figure 5A:
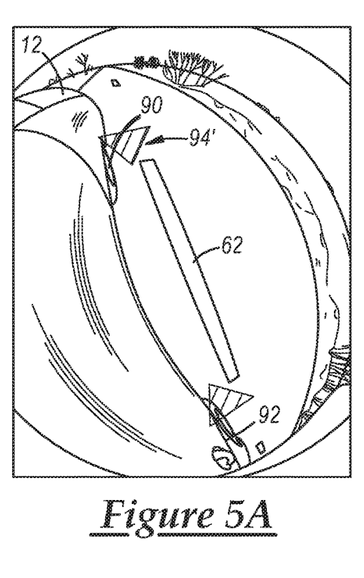

Step 140 displays real time feedback of the parallel parking maneuver on an electronic display unit. There are a number of different ways in which the method can provide the driver with real time visual feedback to indicate when the host vehicle 12 is lawfully or unlawfully parked. According to one possibility that is illustrated in FIG. 4A, step 140 displays real time feedback to the driver in the form of modified video output shown on the display unit 42 (e.g., a center stack display, a side view display assembly and/or a rear view display assembly). The modified video output can function as a parking assessment of sorts and, depending on the particular camera angle, etc., clearly informs the driver as to whether their parallel parking maneuver has resulted in a compliant park job or not. In FIG. 4A, there is shown an image that is extracted from modified video output and is representative of what might be seen by the driver, and the image shows a front tire 90, a rear tire 92, a curb 62, and a visual indicator 94 demonstrating compliance with the pertinent parking regulations. Here the visual indicator 94 is shown as cross-hatched area or region located between the host vehicle 12 and the curb 62, but it is envisioned that indicator 94 could be of a certain color (e.g., green) or have some other indicia that instinctively conveys "compliance" to the driver. In the example of FIG. 5A, instead of the visual indicator occupying all or most of the area in between the host vehicle 12 and the curb 62, the visual indicator 94' is simply a pair of arrows or some other symbol that are colored or otherwise adorned in the modified video output to indicate that the front and rear wheels are within the prescribed maximum parallel parking distance of the curb and, thus, the host vehicle is lawfully parked. In the event that both of the tires are too far from the curb (i.e., beyond the maximum parallel parking distance), step 140 could make the visual indicators 94, 94' red or flash or some other symbol or color that indicates "non-compliance" to the driver. Myriad possibilities exist for conveying this information to the driver, any of which could be used here.

Figure 4B:
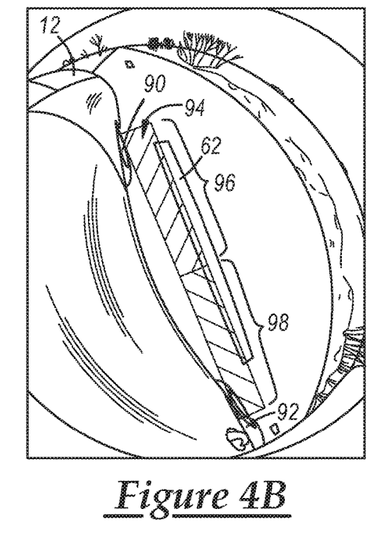
Figure 5B:
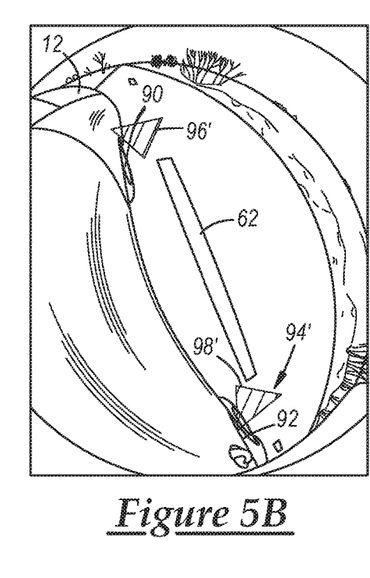

The embodiments of FIGS. 4B and 5B are provided to address the example of when one tire is close enough to the curb and is, thus, compliant, but the other tire is too far away from the curb and is non-compliant. Turning to FIG. 4B, the visual indicator 94 is split into compliant and non-compliant portions 96, 98, where the compliant portion 96 corresponds to the front tire or wheel and the non-compliant portion 98 corresponds to the rear wheel. In this scenario, the driver would see that in order for the host vehicle 12 to be lawfully parked, he or she would need to maneuver the vehicle further and get the rear wheel 92 closer to the curb 62. A similar embodiment is illustrated in FIG. 5B, except that separate symbols 96', 98' are used to indicate one tire's compliance and the other tire's non-compliance. Again, these illustrative images use cross-hatching and shading to convey this point, but it is expected that different colors or other indicia would be used to convey this information to the driver. As an example, compliant portions or symbols 96, 96' could be colored green, whereas non-compliant portions or symbols 98, 98' could be colored red. Any type of suitable display or human-machine-interface (HMI), including those using audio and/or haptic warnings, may be used to provide the driver with real time feedback or an assessment of the parallel parking maneuver.

Figure 6:
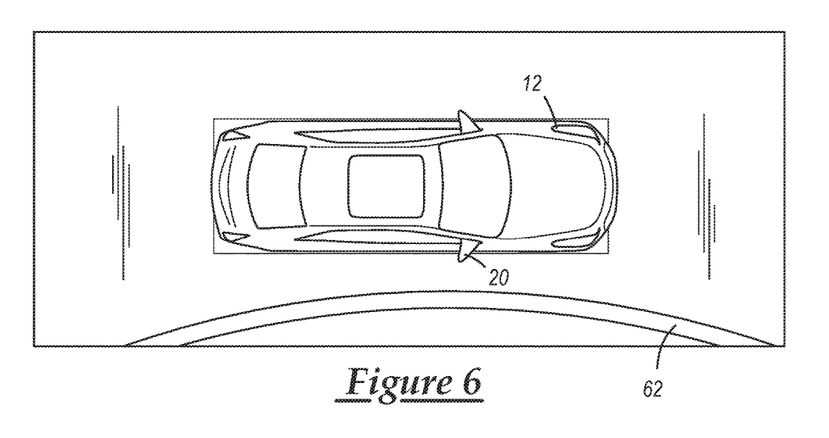

In the embodiments of FIGS. 4A-5B, the modified video output provided to the electronic display unit 42 was essentially the same perspective or angle as that gathered by side camera 20 (i.e., a distorted image of the area along the side or flank of the host vehicle). However, it is also possible for step 140 to provide the modified video output in terms of other perspectives and angles, like the birds-eye view shown in FIG. 6. where the modified video output is the result of several different camera outputs stitched or otherwise combined together to give an overhead sort of perspective of the host vehicle 12. Any combination of the visual indicators 94, 94' from the previous embodiments could be used with the birds-eye view of FIG. 6. Moreover, step 140 could display the modified video output on any combination of display devices 42, such as a center stack display alone, a center stack display and a side view display assembly, or side and rear view display assemblies.

It should be appreciated that while the preceding description has been in the context of parallel parking a vehicle next to a curb, the present system and method may be used in other applications as well. For instance, it is possible to employ the parking assist system and method when non-parallel parking, such as when pulling into a parking spot and having the distance to a front or rear of the parking spot, as well as the corresponding compliance with applicable parking regulations, shown on the visual display 42. In another example, it is possible to employ the parking assist system and method when parallel parking next to a lane marker or painted line on the ground, as opposed to an appreciable curb. In this instance, a method similar to that described above could be used, only the method would calculate the distance to this non-curb barrier. Moreover, it should be recognized that the particular combination and sequence of steps shown in FIG. 3 is simply meant to schematically illustrate one potential embodiment, and that the present system and method are not so limited.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of using a parking assist system for a host vehicle, the parking assist system includes a side camera and an electronic display unit, and the method comprises the steps of:
    obtaining parking regulations;
    detecting a parallel parking maneuver;
    determining a current position of the host vehicle with respect to a nearby curb or other barrier during the parallel parking maneuver, wherein the determining step further comprises determining a first distance from a front tire of the host vehicle to the curb or other barrier and separately determining a second distance from a rear tire of the host vehicle to the curb or other barrier;
    using the current position of the host vehicle to determine if the host vehicle is compliant with the parking regulations, wherein the using step further comprises comparing the first distance to a maximum parallel parking distance to determine if the front tire is compliant with the parking regulations and separately comparing the second distance to the maximum parallel parking distance to determine if the rear tire is compliant with the parking regulations; and
    displaying modified video output on the electronic display unit, wherein the displaying step further comprises gathering video output from the side camera, graphically superimposing one or more visual indicators on top of the video output to create modified video output, and displaying the modified video output on the electronic display unit so that a user is provided with real time visual feedback of the parallel parking maneuver, the modified video output includes the front tire of the host vehicle, the rear tire of the host vehicle, the curb or other barrier and the one or more visual indicators to indicate compliance or non-compliance with the parking regulations.

2. The method of claim 1, wherein the obtaining step further comprises obtaining the parking regulations by using a navigation unit to determine a current location of the host vehicle, and by using a communication unit to automatically retrieve the parking regulations from a remote entity, wherein the parking regulations correspond to the current location of the host vehicle.

3. The method of claim 1, wherein the obtaining step further comprises obtaining the parking regulations by using a navigation unit to determine a current location of the host vehicle, and by using a control unit to automatically retrieve the parking regulations from a look up table stored in an onboard memory device, wherein the parking regulations correspond to the current location of the host vehicle.

4. The method of claim 1, wherein the detecting step further comprises detecting if the host vehicle is being parallel parked by using one or more vehicle sensors to detect a parallel parking maneuver, by using one or more object detection sensors to detect a nearby curb, and by determining that the parallel parking maneuver is being performed at the same time that the host vehicle is within a certain distance of the curb.

5. The method of claim 1, wherein the determining step further comprises determining the current position of the host vehicle with respect to the nearby curb or other barrier by acquiring an image from video output provided by the side camera, analyzing the image with an image processing technique, and calculating a distance from the host vehicle to the curb based on the outcome of the image processing technique.

6. The method of claim 5, wherein the image processing technique counts a number of pixels between at least one of the front or rear tire of the host vehicle and an edge of the curb in the image from the side camera, and correlates the counted pixels to an actual distance from the front or rear tire of the host vehicle to the edge of the curb based on a known scale of the image.

7. The method of claim 5, wherein the image processing technique uses an overlay image with distance markers on top of the image from the side camera, and estimates an actual distance from the at least one of the front or rear tire of the host vehicle to the edge of the curb based on the overlaid distance markers.

8. The method of claim 5, wherein the image processing technique counts a first number of pixels between the front and rear tires of the host vehicle in the image from the side camera, counts a second number of pixels between at least one of the front or rear tire and an edge of the curb in the image from the side camera, and uses the first counted pixels and a known distance between the front and rear tires to correlate the second counted pixels to an actual distance from the front or rear tire to the edge of the curb.

9. The method of claim 5, wherein the image processing technique uses a multi-stage edge detection process to identify an edge of the curb, and at least one of the sub-steps in the multi-stage edge detection process utilizes a Canny filter, a Histogram of Oriented Gradients (HOG) filter, or both to help identify the edge of the curb.

10. The method of claim 1, wherein the using step further comprises using a calculated distance from the host vehicle to the curb and comparing the calculated distance to a maximum parallel parking distance and, based on that comparison, determining if the host vehicle is compliant with the parking regulations.

11. The method of claim 1, wherein the displaying step further comprises displaying the modified video output on one or more electronic display units selected from the group consisting of: a center stack display, a side view display, or a rear view display.

12. The method of claim 1, wherein the one or more visual indicators are provided with a color or other indicia that is intended to convey either compliance status or non-compliance status to the user.

13. The method of claim 1, wherein the one or more visual indicators are graphically superimposed to cover an area in the modified video output located between a side of the host vehicle and the curb or other barrier.

14. The method of claim 1, wherein the one or more visual indicators include graphically superimposed arrows or other symbols in the modified video output.

15. The method of claim 1, wherein the one or more visual indicators are arranged to indicate compliance with the parking regulations for one of the front and rear tires and to indicate non-compliance with the parking regulations for the other of the front and rear tires.

16. The method of claim 1, wherein the displaying step further comprises displaying the modified video output from the same perspective as it is gathered from the side camera.

17. The method of claim 1, wherein the displaying step further comprises displaying the modified video output from a birds-eye perspective that is achieved by stitching together the output from a plurality of cameras located on the host vehicle.

18. A parking assist system for use with a host vehicle, comprising:
  a parking assist control unit;
  a side camera that is coupled to the control unit and provides the control unit with video output of an area located to the side of the host vehicle;
  a communication unit that is coupled to the control unit and provides the control unit with communication output that includes one or more parking regulations; and
  an electronic display unit that is coupled to the control unit and displays modified video, wherein the control unit is configured to:
    determine a current position of the host vehicle with respect to a nearby curb or other barrier, including determining a first distance from a front tire of the host vehicle to the curb and a second distance from a rear tire of the host vehicle to the curb, and the using step further comprises comparing the first distance to a maximum parallel parking distance to determine if the front tire is compliant with the parking regulations and separately comparing the second distance to the maximum parallel parking distance to determine if the rear tire is compliant with the parking regulations,
    use the current position of the host vehicle to determine if the host vehicle is compliant with the parking regulations,
    gather video output from the side camera,
    modify the video output by adding one or more visual indicators that indicate compliance or non-compliance with the parking regulations, and
    display the modified video output on the electronic display unit so that a user is provided with real time visual feedback of the parallel parking maneuver, and wherein the modified video output includes the front tire of the host vehicle, the rear tire of the host vehicle, the curb or other barrier and the one or more visual indicators.

19. A method of using a parking assist system for a host vehicle, the parking assist system includes a side camera and an electronic display unit, and the method comprises the steps of:
  obtaining parking regulations;
  detecting a parallel parking maneuver;
  determining a current position of the host vehicle with respect to a nearby curb or other barrier during the parallel parking maneuver by acquiring an image from video output provided by the side camera, analyzing the image with an image processing technique, and calculating a first distance from a front tire of the host vehicle to the curb and a second distance from a rear tire of the host vehicle to the curb based on the outcome of the image processing technique;
  using the current position of the host vehicle to determine if the host vehicle is compliant with the parking regulations; and
  displaying modified video output on the electronic display unit, wherein the modified video output provides real time visual feedback of the parallel parking maneuver and includes one or more visual indicators to indicate compliance or non-compliance with the parking regulations;
  wherein the image processing technique counts a first number of pixels between the front and rear tires of the host vehicle in the image from the side camera, counts a second number of pixels between one of the front and rear tires and an edge of the curb in the image from the side camera, and uses the first counted pixels and a known distance between the front and rear tires to correlate the second counted pixels to an actual distance from one of the front and rear tires to the edge of the curb.

* * * * *